United States Patent [19]
Newburgh et al.

[11] 3,910,373
[45] Oct. 7, 1975

[54] ACOUSTIC ROTATION RATE SENSOR
[75] Inventors: Ronald G. Newburgh, Belmont; Alan J. Budreau, Arlington, both of Mass.
[73] Assignee: The United States of America as represented by the Secretary of the Air Force, Washington, D.C.
[22] Filed: Nov. 7, 1973
[21] Appl. No.: 413,729

[52] U.S. Cl. ............... 181/.5; 356/106 LR; 333/72; 235/150.25
[51] Int. Cl.² ......................................... G01K 11/00
[58] Field of Search ........... 356/106 LR; 181/.5 NP; 73/69, 432 L; 333/71, 72; 235/150.25

[56] References Cited
UNITED STATES PATENTS
3,395,270 7/1968 Speller ......................... 356/106 LR OTHER PUBLICATIONS
Koch et al., "Refracting Sound Waves,"9/49, pp. 471–481, Jour. Acoust. Soc. Amer., Vol. 21, No. 5.
Koch, "Related Experiments with Sound Waves and E–M Waves,"7/59, pp. 1192–1201, Proc. of I.R.E., Vol. 47, No. 7.
Guidice et al., "Ring Laser . . . Rotation Sensing", 9/63, pp. 1–15, Tech. Doc. Report No. ASP-TPR-6-3-694.

Primary Examiner—Malcolm F. Hubler
Assistant Examiner—N. Moskowitz
Attorney, Agent, or Firm—Joseph E. Rusz; Willard R. Matthews, Jr.

[57] ABSTRACT
High sensitivity rotation rate measurement is accomplished by means of an acoustic surface wave Sagnac effect sensor. An annular or ring-shaped member of acoustic wave material having a peripheral acoustic surface wave propagation surface is combined with a closely proximate (but separate) electromagnetic wave/acoustic surface wave transducer. The annular member is in a fixed inertial frame and rotatable about its major axis. The transducer is in a fixed frame relative to rotation of the annular member and induces clockwise and counterclockwise acoustic surface waves on the acoustic surface wave propagation surface in response to an electromagnetic wave input. The transducer also produces electromagnetic wave signals in response to the clockwise and counterclockwise acoustic surface waves. Rotational movements of the annular member relative to the transducer effects a circulation time difference between the clockwise and counterclockwise acoustic surface waves. The resulting electromagnetic wave signals are detected and processed as a measure of the rotation rate of the annular member.

1 Claim, 7 Drawing Figures 3,910,373

ACOUSTIC ROTATION RATE SENSOR

BACKGROUND OF THE INVENTION

This invention relates to rotation rate sensors and in particular to Sagnac effect devices that operate by means of acoustic surface waves.

The Sagnac effect has been used as the basis of two closely related devices, each of which measures rotation rates. The two devices are the ring laser gyro and the ring interferometer. The effect expresses itself as the circulation time difference between two light beams traversing the ring in opposite directions.

The similar yet different approach to the problem comprehended by the present invention is realized by using acoustic surface waves. The similarity lies in the use of two waves circulating in opposite directions. The difference is the difference between light waves and sound waves. Light waves in vacuo do not propagate with the aid of a medium. The velocity of propagation is constant in all inertial frames of reference. This is not true for acoustic waves which do require a medium, the velocity of which must be considered in calculating the wave velocity in different frames of reference. A second difference between light waves and acoustic waves is the absolute magnitudes of their velocities. An acoustic surface wave travels approximately $10^5$ times more slowly than a light wave. Therefore the wavelength of an acoustic surface wave corresponding to a given frequency is $10^5$ times shorter than the wave length of a light wave corresponding to the same frequency.

It is just this difference in propagation velocities which suggests the possibility of constructing an acoustic Sagnac device with a corresponding increase in sensitivity as compared to optical Sagnac devices.

SUMMARY OF THE INVENTION

The rotation rate sensor comprehended by the present invention is a Sagnac effect type device in which the relative time displacements of clockwise and counterclockwise acoustic surface waves propagating around a rotatable annular substrate member are utilized to determine relative rotation between the substrate member and its supporting frame. The acoustic surface waves are generated and subsequently detected by an electromagnetic wave/acoustic surface wave transducer. The transducer is closely proximate to the annular substrate member and in a fixed frame relative to its rotational motion.

It is a principal object of the invention to provide a new and improved rotation rate sensor.

It is another object of the invention to provide a Sagnac effect type rotation rate sensor that utilizes acoustic surface waves.

It is another object of the invention to provide a Sagnac effect type rotation rate sensor having greater sensitivity than currently available devices of that type.

These, together with other objects, features and advantages of the invention will become more readily apparent from the following detailed description taken in conjunction with the accompanying drawings.

DETAILED DESCRIPTION OF THE PREFERRED EMBODIMENT

In order to demonstrate the analytical basis for the acoustic surface wave rotation rate sensor of the invention, it is necessary to first derive the basic equations governing the operation of optical Sagnac type devices.

Figure 1:
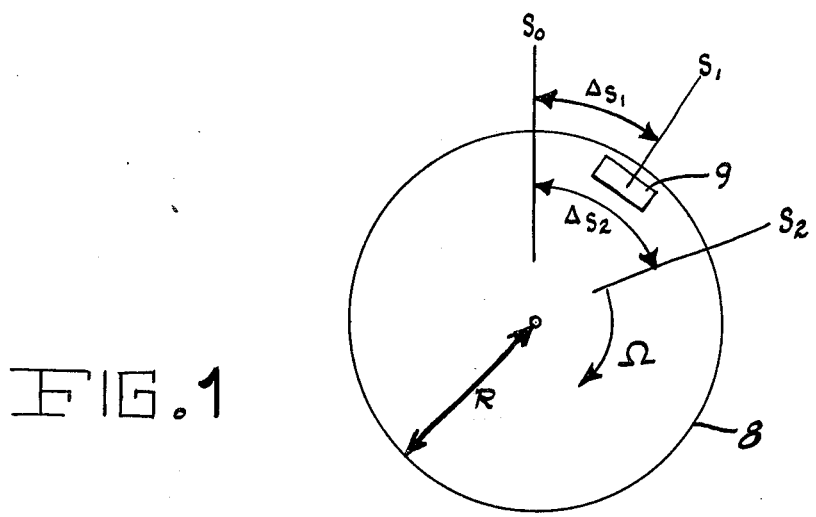
FIG. 1 is an illustration of the basic elements of an optical Sagnac effect rotation rate sensor.

To derive the Sagnac time difference consider a beam splitter 9 attached to a disk 8 of radius R, as shown in FIG. 1. Light is emitted at the beam splitter in both the clockwise (cw) and counterclockwise (ccw) directions. To simplify the derivation let both beams travel along a circular optical path of radius R. Let $S_o$ be the beam splitter position when the light is emitted, at time t equals zero. The disk rotates with angular velocity $\Omega$ in an inertial frame K. All observations are to be made in this frame. The ccw beam returns to the splitter at positions $S_1$ at time $t_1$. The cw beam returns to the splitter at position $S_2$ at time $t_2$. Computation of $t_1$ and $t_2$ is as follows:

$$\begin{cases} t_1 = (2\pi R - \Delta S_1)/C = \Delta S_1/\Omega R \\ t_1 = (2\pi R/C)/(1 + \Omega R/C) \end{cases}$$

$$\begin{cases} t_2 = (2\pi R + \Delta S_2)/C = \Delta S_2/\Omega R \\ t_2 = (2\pi R/C)/(1 - \Omega R/C) \end{cases}$$

$$\Delta t = t_2 - t_1 = 4 A \Omega/C^2 [1 - (\Omega R/C)^2] \quad (1)$$

where $A = \pi R^2$. The velocity of propagation is taken to be a constant c for the cw and ccw beam, since the frame of reference is inertial. This is in accordance with Einstein's second postulate. A fringe shift $\Delta Z$ can then be computed from Equation (1);

$$\begin{aligned} \Delta Z &= c \Delta t/\lambda \\ \Delta Z &= c \Delta t/\lambda \\ &= 4 A \Omega/c \lambda [1 - (\Omega R/c)^2] \end{aligned} \quad (2)$$

and a corresponding phase shift $\lambda \phi$, $$\begin{aligned} \Delta \phi &= 2\pi \Delta Z \\ &= 8\pi \Omega/c \lambda [1 - (\Omega R/c)^2]. \end{aligned} \quad (3)$$

Equation (2) is used to describe the original Sagnac experiment and Equation (3) describes the polarization ring interferometer.

The ring laser differs from the interferometer. The ring contains an active lasing material which behaves as two independent oscillators. When the ring is stationary ($\Omega = 0$), the two oscillators are at the same frequency. When the ring rotates, the paths for the two beams are different and a beat frequency is observed. The shift in frequency $\Delta v$ is related to the path difference $\Delta p$ as $$\Delta v/v = \Delta p/p.$$

$\Delta t$ of Equation (1) is used to compute $\Delta p$, $$\Delta p = c \Delta t$$

and $$p = 2\pi R.$$

Therefore $$\Delta v = v(c \Delta t / 2\pi R) = \frac{v c \, 4\pi R^2 \Omega}{2\pi R \, c^2[1-(\Omega R/c)^2]} = 2R\Omega/\lambda [1 - (\Omega R/c)^2] \quad (4)$$

To the first order Equations (2), (3) and (4) can be written as $$\Delta Z \sim 4 A \Omega / c \lambda \quad (2')$$
$$\Delta \phi \sim 8 A \Omega / c \lambda \quad (3')$$
$$\Delta \nu \sim 2 R \Omega / \lambda \quad (4')$$

A fringe sensitivity, $S_Z$, can then be defined as the fringe shift per radian per second as a phase sensitivity; $S\phi$ as the phase shift per radian per second; and as a frequency sensitivity, $S\nu$, as the frequency shift per radian per second.

$$\Delta Z = S_Z \Omega; \quad S_Z = 4 A / c \lambda \quad (5)$$
$$\Delta \phi = S \phi \Omega; \quad S \phi = 8 \pi A / c \lambda \quad (6)$$
$$\Delta \nu = S \nu \Omega; \quad S \nu = 2 R / \lambda \quad (7)$$

$S_Z$ and $S\phi$ are both directly proportional to area and inversely proportional to the product $c \lambda$, whereas $S \nu$ is proportional to radius and inversely proportional to wavelength alone. This arises because fringe shifts and phase shifts are represented by dimensionless quantities unlike frequency which is an inverse time. It is also quite obvious that any way in which one could decrease velocity $c$ and wavelength $\lambda$ would increase both fringe and phase sensitivity accordingly. A decrease in wavelength would increase frequency sensitivity correspondingly. This analysis initiated the consideration of acoustic waves for a possible acoustic interferometer and constituted the basic concept of the present invention.

As indicated above, acoustic surface waves propagate with a velocity smaller than that of light by a factor of $10^5$. As a consequence an acoustic wave of the same frequency as an electromagnetic wave has a wavelength which is also $10^5$ times shorter. The product ($\lambda c)_l \phi$ for 6000 A light is $(\lambda c)_l \sim 2 \times 10^6$ cm²/sec whereas for an acoustic surface wave of frequency $10^9$ Hz the product is $(\lambda c)_a \sim 10^2$ cm²/sec.

Hence for rings of the same area $S_\phi$ for $10^9$ Hz acoustic waves would be about $2 \times 10^4$ times greater than $S_\phi$ for 6000 A light, provided the acoustic Sagnac effect exists.

To show that a one-to-one correspondence between sound and light waves does not exist consider the situation sketched in FIG. 1. Let beam splitter 9 now represent a transducer mounted on the disk 8 (disk 8 in this instance comprising an acoustic wave substrate member). At time $t$ equals zero acoustic surface waves are generated which will propagate in the cw and ccw directions. The disk rotates as before with angular velocity $\Omega$ in the cw direction as seen by an inertial observer in K. Let $c$ be the acoustic velocity of propagation with respect to the disk. However, every point on the disk's circumference moves with velocity $\Omega R$ in the cw direction. This is the motion of the medium. Therefore as measured in K the ccw beam propagates with velocity $c - \Omega R$ and the cw beam with velocity $c + \Omega R$. The ccw beam returns to the transducer at position $S_1$ at time $t_1$ and the cw beam returns to the transducer at position $S_2$ at time $t_2$. These times are $$\begin{cases} t_1 = (2 \pi R - \Delta S_1) / (c - \Omega R) = \Delta S_1 / \Omega R \\ t_1 = 2 \pi R / c \end{cases}$$

and $$\begin{cases} t_2 = (2 \pi R + \Delta S_1) / (c + \Omega R) = \Delta S_2 / \Omega R \\ t_2 = 2 \pi R / c. \end{cases}$$

Hence there is no time difference between the two beams and no effect. This is a consequence of the non-constancy of acoustic propagation velocity.

However a different arrangement (the arrangement comprehended by the invention) does predict a result. This arrangement requires separation of the transducer from the disk so that the transducer is at rest in the inertial frame while the disk rotates. (An equivalent arrangement would be for the disk to be at rest in the inertial frame while the transducer rotates about it.) This arrangement is physically possible because a transducer need not be in intimate contact with the material to be able to generate surface waves on the material. If the transducer is positioned at the top of the disk but separated from it, that position is fixed in the inertial frame, although the disk rotates underneath it. Each beam must follow the path $2 \pi R$ in inertial space. The ccw beam requires time $t_1$, $$t_1 = 2 \pi R / (c - \Omega R)$$

and the cw beam requires time $t_2$, $$t_2 = 2 \pi R / (c + \Omega R)$$

(Note that $t_1$ is now greater than $t_2$.)
The time difference is $$\Delta t = t_1 - t_2 = 4 A \Omega / c^2 [1 - (\Omega R / c)^2] \quad (8)$$

with a corresponding fringe shift $$\Delta Z = c \Delta t / \lambda = 4 A \Omega / c \lambda [1 - (\Omega R / c)^2] \quad (9)$$

and phase shift $$\Delta \phi = 2 \Delta Z = 8 \pi A \Omega / c \lambda [1 - (\Omega R / c)^2] \quad (10)$$

The fringe and phase sensitivities for the first order approximation are $$S_Z = 4 A / c \lambda \quad (11)$$

and $$S_\phi = 8\pi A/c\lambda \quad (12)$$

Equations (8) through (12) are therefore formally identical with Equations (1), (2), (3) and (5), (7). However, the $c$ and $\lambda$ now refer to the acoustic surface wave. The sensitivities $S_z$ and $S_\phi$ are now considerably greater.

To use such a device as an inertial rotation rate sensor requires relative motion between the disk and the transducer. Accordingly, the present invention comprehends a device in which the ring is at rest in an inertial frame (defined by the fixed stars) and the transducer is at rest in the rotating frame. The disk is then regarded as supporting a standing wave in inertial space, the energy density of which is sampled by the transducer moving along the pattern. This is analogous to the mechanical gyroscope. The rotor is supported in an (ideally) torqueless, frictionless mount and set spinning. Its angular momentum vector is then fixed in inertial space. When observed in the rotating frame (in which the mount is at rest) the angular momentum vector changes direction. This change is a measure of the rotation with respect to the inertial frame.

By using a mechanical mount of this type for the disk (or even a magnetic suspension), the disk preserves its direction in inertial space. This can be assured by spinning the disk at some definite rate. Such a spin provides a reference signal for the interferometer. Subsequent rotation of the system will change the relative motion between transducer and disk and thus change the reference signal. This change provides the rotation sensing.

Figure 2:
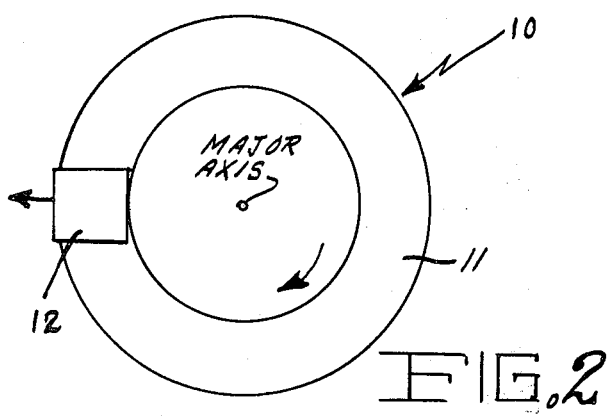
FIG. 2 is a plan view of one embodiment of the invention.
Figure 3:
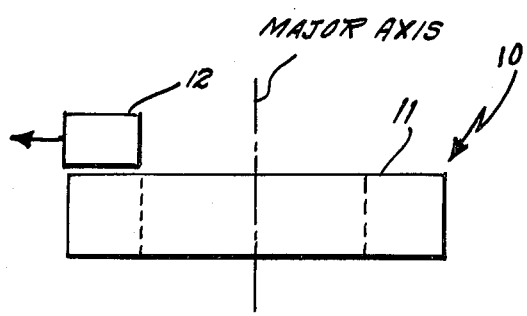
FIG. 3 is a side view of the device of FIG. 2.
Figure 4:
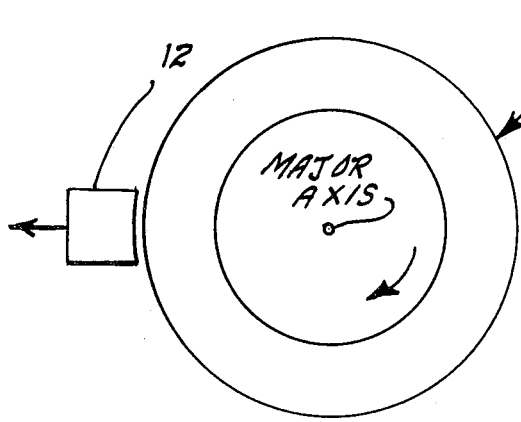
FIG. 4 is a plan view of a second embodiment of the invention.
Figure 5:
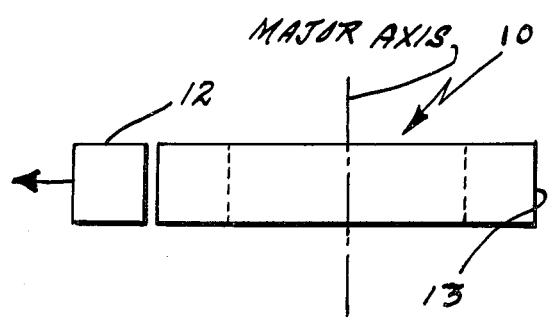
FIG. 5 is a side view of the device of FIG. 4.

Referring now to FIGS. 2 and 3, there is illustrated thereby a rotation rate sensor incorporating the principles of the invention. It comprises an annular member 10 having an acoustic surface wave propagating surface 11. An electromagnetic wave/acoustic surface wave transducer 12 is positioned in close proximity to the propagating surface 11. Annular member 10 is rotatable about its major axis and is maintained in a fixed inertial frame by conventional gyroscope apparatus (not shown). Transducer 12 is maintained in a fixed frame relative to rotation of annular member 10. Transducer 12 can be a conventional interdigital acoustic surface wave transducer and annular member 10 can be fabricated of piezoelectric material. One problem with the configuration of FIGS. 2 and 3 is that most piezoelectric materials are anisotropic and the proper orientation of the crystalline axis is difficult to maintain at the edge of a disk. However, an isotropic material requiring electrical poling can be used and poled to obtain the required orientation. The alternative embodiment of FIGS. 4 and 5 can also be used to overcome this problem. By putting the acoustic surface wave propagating surface 13 on the peripheral edge of the annular member 10 the problem of properly aligning the crystalline axis is eliminated.

The invention can also be practiced by using what is known as direct electromagnetic generation. In such an arrangement a combination of currents and Lorentz forces are used to generate acoustic waves in a conducting material. In this case the disk is fabricated of a suitable metal such as an aluminum alloy and a transducer comprising a coil and magnet assembly is mounted at its edge. This type of device is well known in the art and is reviewed in the periodical article entitled, Electromagnetic Generation of Ultrasound in Metals, by W. P. Wallace, published in International Journal of Nondestructive Testing 2, pp 309–334 (1971).

The several acoustic surface wave generation schemes disclosed herein are inherently bidirectional. They inherently function as beam splitters and the output in each instance will represent the combination of signals which have traveled in the two opposite senses around the circumference of the annular member. The initial exciting signal will also be present and must be removed. If operation is in the cw mode, this can be done by use of a circulator to distinguish the two signals, however only a limited amount of isolation can be obtained in this way. If it should prove inadequate, much better isolation can be obtained by use of pulse technique, taking advantage of the time delay inherent in the acoustic propagation to allow gating of the required signal only.

Figure 6:
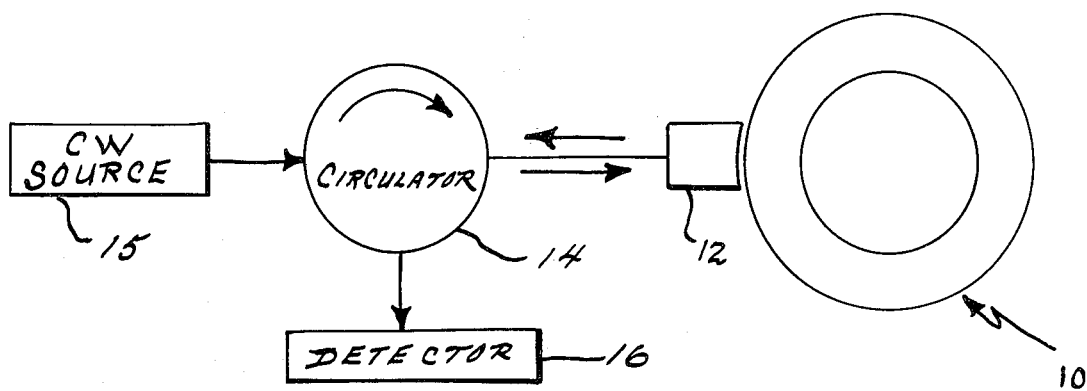
FIG. 6 is a block diagram of a signal processing circuit for the invention.

FIG. 6 illustrates a circuit suitable for cw mode of operation. A cw electromagnetic wave source supplies transducer 12 through circulator 14. The output signals from the transducer are returned through circulator 14 to detector 16 where they are processed as a measure of rate of rotation of annular member 10.

Figure 7:
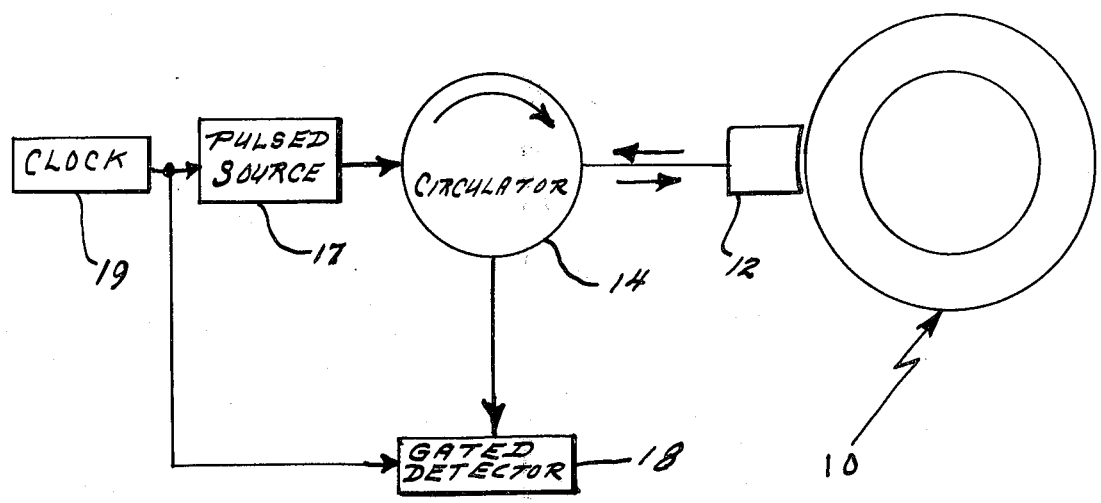
FIG. 7 is a block diagram of an alternative signal processing circuit for the invention.

Pulsed operation is accomplished by means of the circuit of FIG. 7. Pulsed electromagnetic wave source 17 supplies transducer 12 through circulator 14. Gated detector 18 processes this output pulse from the transducer as they are returned through the circulator 14. Clock 19 controls both pulsed source 17 and gated detector 18. Conventional signal processing techniques are used in each instance and the choice of signal processing circuits is determined by the requirements of the particular application.

While the invention has been described in terms of its preferred embodiments, it is understood that the words which have been used are words of description rather than words of limitation and that changes within the purview of the appended claims may be made without departing from the scope and spirit of the invention in its broader aspects.

What is claimed is:

1. An acoustic rotation rate sensor comprising
an annular member of acoustic wave substrate material having an acoustic surface wave propagation surface there around, said annular member being in a fixed inertial frame and rotatable about its major axis,
transducer means in a fixed frame relative to rotation of said annular member and positioned separate from and in close proximity to the acoustic surface wave propagation surface thereof, said transducer means being adapted to generate, in response to an electromagnetic wave input, clockwise and counterclockwise acoustic surface waves on said acoustic surface wave propagation surface, and to generate first and second electromagnetic wave output signals in response to said clockwise and counterclockwise acoustic surface waves,
a source of electromagnetic wave energy connected to said transducer means, and
detector means connected to said transducer means adapted to process said first and second electromagnetic wave output signals as a measure of relative motion between said annular member and said transducer.

* * * * *